United States Patent
Sakatani et al.

(10) Patent No.: US 12,040,462 B2
(45) Date of Patent: Jul. 16, 2024

(54) POWER STORAGE MODULE AND POWER STORAGE CELL

(71) Applicant: Prime Planet Energy & Solutions, Inc., Tokyo (JP)

(72) Inventors: Toshihiro Sakatani, Kakogawa (JP); Tsuyoshi Komaki, Himeji (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 233 days.

(21) Appl. No.: 17/329,155

(22) Filed: May 25, 2021

(65) Prior Publication Data
US 2021/0376398 A1 Dec. 2, 2021

(30) Foreign Application Priority Data
May 26, 2020 (JP) .................................. 2020-091183

(51) Int. Cl.
| | |
|---|---|
| *H01M 10/48* | (2006.01) |
| *H01M 10/0525* | (2010.01) |
| *H01M 50/209* | (2021.01) |
| *H01M 50/213* | (2021.01) |
| *H01M 50/291* | (2021.01) |
| *H02J 7/00* | (2006.01) |

(52) U.S. Cl.
CPC ..... *H01M 10/488* (2013.01); *H01M 10/0525* (2013.01); *H01M 10/482* (2013.01); *H01M 50/209* (2021.01); *H01M 50/213* (2021.01); *H01M 50/291* (2021.01); *H02J 7/0047* (2013.01)

(58) Field of Classification Search
None
See application file for complete search history.

(56) References Cited

U.S. PATENT DOCUMENTS

| | | | |
|---|---|---|---|
| 2006/0261960 A1 | 11/2006 | Haraguchi et al. | |
| 2011/0121951 A1 | 5/2011 | Yao | |
| 2014/0193690 A1* | 7/2014 | Guen | H01M 50/591 |
| | | | 429/121 |
| 2015/0140379 A1 | 5/2015 | Yau | |
| 2015/0180080 A1 | 6/2015 | Burri et al. | |
| 2017/0207465 A1 | 7/2017 | Nishimura et al. | |

(Continued)

FOREIGN PATENT DOCUMENTS

| | | |
|---|---|---|
| CN | 200953349 Y | 9/2007 |
| CN | 103069616 A | 4/2013 |
| CN | 104733767 A | 6/2015 |

(Continued)

*Primary Examiner* — Brian R Ohara
*Assistant Examiner* — Patrick Marshall Greene
(74) *Attorney, Agent, or Firm* — HAUPTMAN HAM, LLP

(57) ABSTRACT

A power storage module includes: a plurality of power storage cells; a first indication portion that is provided on each of the power storage cells and that indicates first identification information; and a second indication portion that is provided on each of the power storage cells and that indicates second identification information different from the first identification information. In a state in which the power storage module including the plurality of power storage cells is formed, the first indication portion is exposed to outside of the power storage module, and the second indication portion is not exposed to the outside of the power storage module.

15 Claims, 5 Drawing Sheets

(56) References Cited

U.S. PATENT DOCUMENTS

2019/0036087 A1    1/2019  Osasa et al.

FOREIGN PATENT DOCUMENTS

| CN | 204391163 U   | 6/2015  |
| CN | 107316953 A   | 11/2017 |
| CN | 109326745 A   | 2/2019  |
| JP | 3062385 U     | 7/1999  |
| JP | 2004-119319 A | 4/2004  |
| JP | 2006324074 A  | 11/2006 |
| JP | 2009-152208 A | 7/2009  |
| JP | 2011113972 A  | 6/2011  |
| JP | 2011-249167 A | 12/2011 |
| JP | 2012113854 A  | 6/2012  |
| JP | 2015-156300 A | 8/2015  |
| JP | 2017-059376 A | 3/2017  |
| JP | 2017-130445 A | 7/2017  |
| WO | 2012021280 A1 | 2/2012  |

* cited by examiner

POWER STORAGE MODULE AND POWER STORAGE CELL

This nonprovisional application is based on Japanese Patent Application No. 2020-091183 filed on May 26, 2020 with the Japan Patent Office, the entire contents of which are hereby incorporated by reference.

BACKGROUND OF THE INVENTION

Field of the Invention

The present disclosure relates to a power storage module and a power storage cell.

Description of the Background Art

Conventionally, identification information has been indicated on a power storage cell. For example, Japanese Patent Laying-Open No. 2006-324074 (PTL 1) discloses that an IC tag is attached to a base composed of an insulative resin and provided on a sealing plate of a battery, and information required for manufacturing, distribution, and use, and information required after end of use are recorded in the IC tag.

Japanese Patent Laying-Open No. 2011-113972 (PTL 2) discloses that faking is prevented by doubling identifiers provided on a main body of a battery cell to be accommodated in a casing.

Japanese Patent Laying-Open No. 2012-113854 (PTL 3) discloses that a plurality of identification information indication portions are provided on an upper surface of a battery cover of a prismatic battery.

A plurality of types of identification information required in different phases may be indicated on a power storage cell. For example, identification information required when assembling the power storage module or using the power storage module, and identification information required after using (when discarding) the power storage module are different from each other in terms of phases in which these pieces of identification information are required. Each of the plurality of pieces of identification information must be readable in a phase in which the piece of identification information is required.

When a plurality of power storage cells are arranged to form a power storage module, identification information indicated on a power storage cell may be unable to be read from outside. On the other hand, due to an external factor (interference, rubbing, or the like) during use of the power storage module, an indication portion indicating the identification information may be damaged, with the result that the identification information may be unable to be read.

Each of the inventions disclosed in PTL 1 to PTL 3 is not necessarily sufficient in terms of solving the above problems.

SUMMARY OF THE INVENTION

An object of the present disclosure is to provide a power storage module and a power storage cell, by each of which in the case where a plurality of pieces of different types of identification information are indicated on a power storage cell, each of the pieces of identification information can be read when the piece of identification information is required.

A power storage module according to the present disclosure is a power storage module including: a plurality of power storage cells; a first indication portion that is provided on each of the power storage cells and that indicates first identification information; and a second indication portion that is provided on each of the power storage cells and that indicates second identification information different from the first identification information. In a state in which the power storage module including the plurality of power storage cells is formed, the first indication portion is exposed to outside of the power storage module and the second indication portion is not exposed to the outside of the power storage module.

A power storage cell according to the present disclosure is an power storage cell including: a first indication portion that indicates first identification information; and a second indication portion that indicates second identification information different from the first identification information. When a power storage module including a plurality of the power storage cells is formed, the first indication portion is provided at a position exposed to outside of the power storage module, and the second indication portion is provided at a position not exposed to the outside of the power storage module.

According to each of the power storage module and the power storage cell according to the present disclosure, in the state in which the power storage module is formed, the first indication portion that indicates the first identification information is exposed to the outside of the power storage module. Hence, the first identification information can be read from the outside of the power storage module. On the other hand, in the state in which the power storage module is formed, the second indication portion that indicates the second identification information is not exposed to the outside of the power storage module. Hence, the second identification information can be suppressed from being damaged due to an external factor during use of the power storage module. Therefore, each of the first identification information and the second identification information different from each other can be read when it is required.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present disclosure will be described. In the embodiments described below, when reference is made to number, amount, and the like, the scope of the present disclosure is not necessarily limited to the number, amount, and the like unless otherwise stated particularly. In the embodiments described below, each component is not necessarily essential to the present disclosure unless otherwise stated particularly.

First Embodiment

Figure 1:
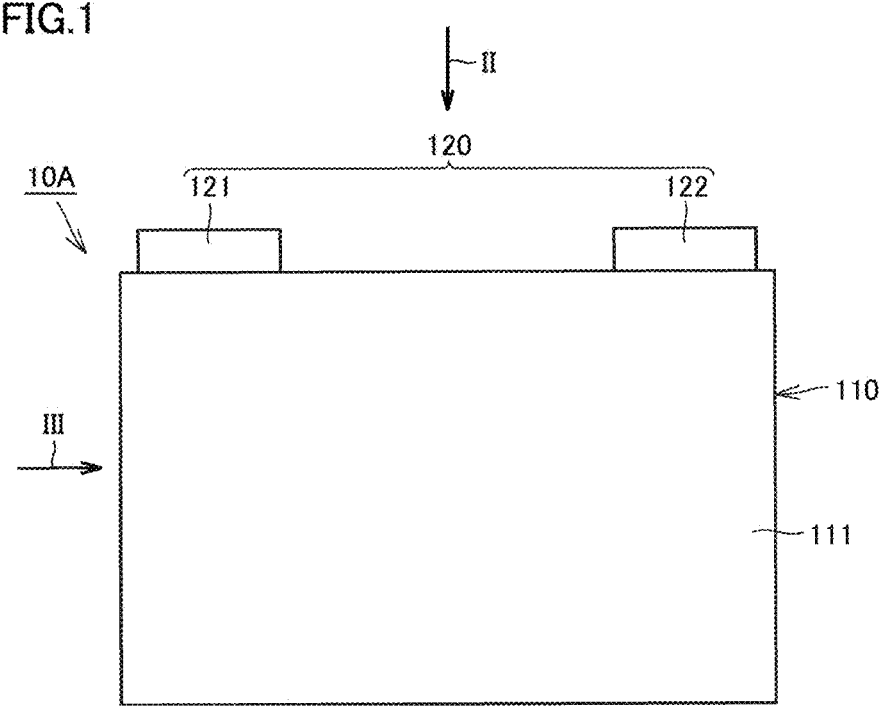
FIG. 1 is a diagram showing a power storage cell according to a first embodiment.
Figure 2:
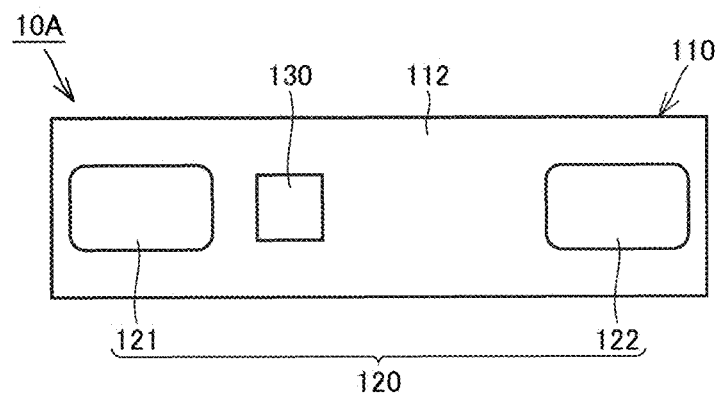
FIG. 2 is a diagram showing a state in which the power storage cell of FIG. 1 is viewed in a direction of an arrow II.
Figure 3:
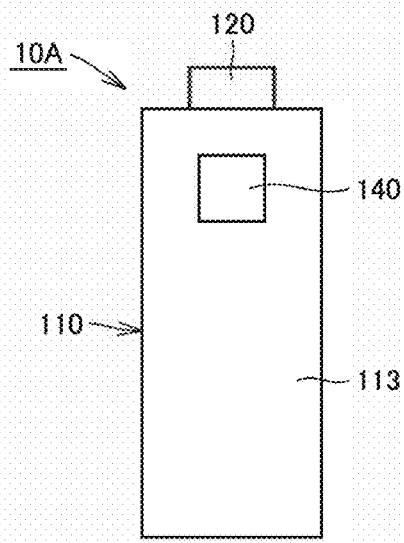
FIG. 3 is a diagram showing a state in which the power storage cell of FIG. 1 is viewed in a direction of an arrow III.
Figure 4:
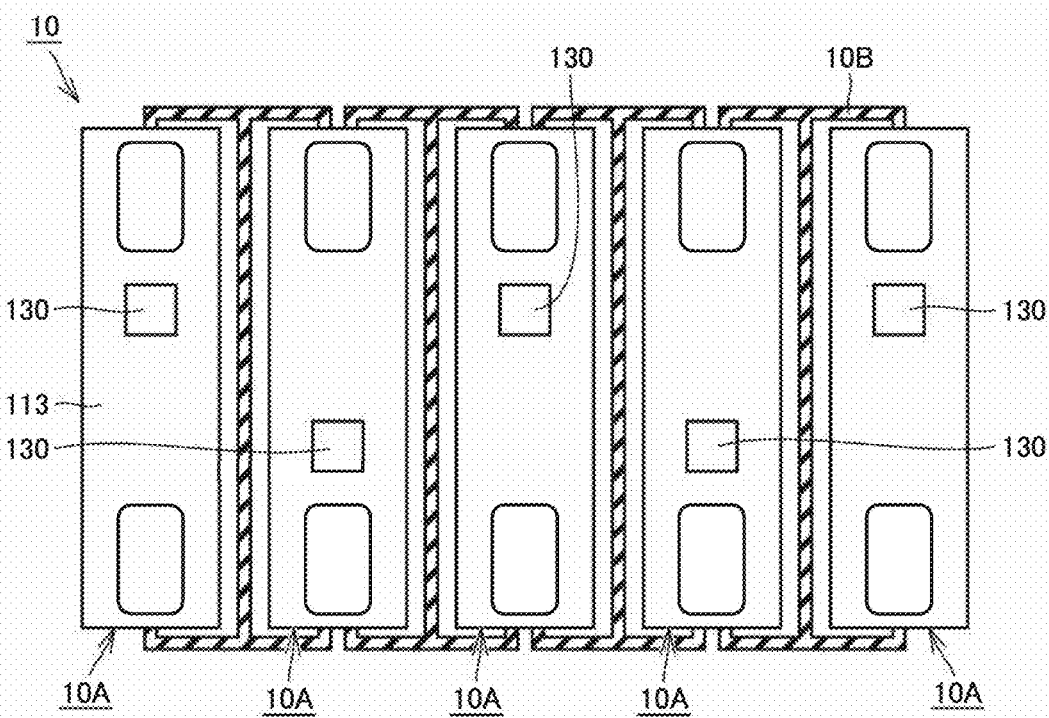
FIG. 4 is a first diagram showing a power storage module according to the first embodiment.
Figure 5:
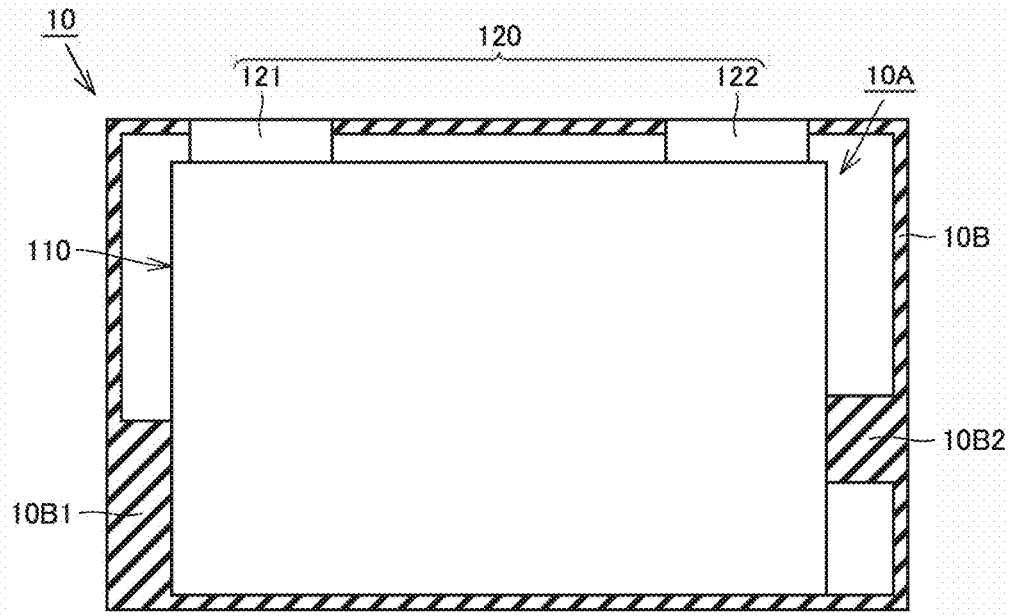
FIG. 5 is a second diagram showing the power storage module according to the first embodiment.

FIG. 1 is a diagram showing a power storage cell 10A according to a first embodiment. FIGS. 2 and 3 are diagrams showing states in which the power storage cell of FIG. 1 is viewed in directions of arrows II and III, respectively. FIGS. 4 and 5 are diagrams showing a power storage module 10 formed by stacking a plurality of power storage cells 10A.

As shown in FIGS. 1 to 3, each of power storage cells 10A includes a main body container 110, an electrode terminal 120, a first indication portion 130, and a second indication portion 140. As an example, power storage cell 10A is a lithium ion battery, but power storage cell 10A may be a nickel-metal hydride battery. The scope of the present disclosure is not limited to the battery, and for example, the power storage cell may be a capacitor.

Main body container 110 has a main surface 111, an upper surface 112, and a side surface 113. That is, main body container 110 is a container having a prismatic shape with six surfaces.

Electrode terminal 120 includes a positive electrode terminal 121 and a negative electrode terminal 122. Electrode terminal 120 is formed to protrude from upper surface 112 of main body container 110 to outside of main body container 110.

First indication portion 130 is provided on upper surface 112 of main body container 110. Second indication portion 140 is provided on side surface 113 of main body container 110. That is, second indication portion 140 is provided on a surface of main body container 110 different from the surface thereof on which first indication portion 130 is provided. First indication portion 130 and second indication portion 140 indicate different pieces of identification information.

The identification information (first identification information) indicated on first indication portion 130 includes information required when assembling power storage module 10 or when using power storage module 10. Specific examples of the first identification information include information about production conditions of power storage cell 10A. The information about production conditions include traceability of each member, for example.

The identification information (second identification information) indicated on second indication portion 140 includes information required after disassembling power storage module 10. Specific examples of the second identification information include information conforming to the laws of each country. The information conforming to the laws includes recycling measures, for example.

Each of first indication portion 130 and second indication portion 140 may be formed by attaching a label indicating predetermined identification information onto main body container 110, or may be formed by directly printing or inscribing the predetermined identification information on main body container 110.

As shown in FIGS. 4 and 5, power storage module 10 is constructed by stacking the plurality of power storage cells 10A and constraining them in the stacking direction. Power storage module 10 includes an insulative case 10B (partition wall) that accommodates power storage cells 10A. Case 10B is a frame body composed of a non-conductive resin.

For convenience of illustration, FIG. 4 shows that case 10B is integrally formed to extend over the plurality of power storage cells 10A, but case 10B may be formed in a divided manner for each individual power storage cell 10A.

First indication portion 130 provided on upper surface 112 of main body container 110 is exposed to the outside from case 10B. Therefore, the identification information indicated on first indication portion 130 is visually recognizable from the outside of power storage module 10. For convenience of illustration, FIG. 5 shows that case 10B covers the upper side of main body container 110; however, first indication portion 130 provided on upper surface 112 of main body container 110 is not covered with case 10B, and first indication portion 130 is exposed to the outside of power storage module 10.

On the other hand, second indication portion 140 provided on side surface 113 of main body container 110 is covered with case 10B and is not exposed to the outside of case 10B.

Thus, in the present embodiment, in the state in which power storage module 10 including the plurality of power storage cells 10A is formed, first indication portion 130 is exposed to the outside of power storage module 10. Hence, the identification information indicated on first indication portion 130 can be read from the outside of power storage module 10 when assembling or using power storage module 10.

Further, in the present embodiment, in the state in which power storage module 10 including the plurality of power storage cells 10A is formed, second indication portion 140 is not exposed to the outside of power storage module 10. Hence, the identification information indicated on second indication portion 140 can be suppressed from being damaged due to an external factor (interference, rubbing, or the like) during use of power storage module 10 to result in illegibility of the identification information after disassembling power storage module 10.

In a typical example, since case 10B is not transparent, the identification information indicated on second indication portion 140 is not visually recognizable from the outside of power storage module 10. However, case 10B may be constituted of a transparent member such that the identification information indicated on second indication portion 140 is visually recognizable from the outside of power storage module 10.

Further, case 10B is not necessarily essential in power storage module 10. Insulation between the plurality of power storage cells 10A may be secured by an insulating tape or the like, for example.

In the present embodiment, it has been illustratively described that second indication portion 140 is provided on side surface 113; however, second indication portion 140 may be provided on main surface 111. Since side surface 113 is less deformed than main surface 111 during operation of power storage module 10, damage to the identification information indicated on second indication portion 140 can be more effectively suppressed by providing second indication portion 140 on side surface 113 as in the present embodiment.

As shown in FIG. 5, power storage cell 10A is fitted inside case 10B. Case 10B has abutment portions 10B1, 10B2 in abutment with power storage cell 10A. Each of abutment portions 10B1, 10B2 constitutes a reference plane for fitting and fixing power storage cell 10A to case 10B. Second indication portion 140 is formed at a position to avoid abutment portions 10B1, 10B2. Therefore, the identification information indicated on second indication portion 140 can be suppressed from being damaged due to interference, rubbing, or the like with abutment portions 10B1, 10B2 to result in illegibility of the identification information after disassembling power storage module 10.

As described above, according to each of power storage cell 10A and power storage module 10 according to the present embodiment, when each of the plurality of different pieces of identification information is required, the piece of identification information can be securely read.

Second Embodiment

Figure 6:
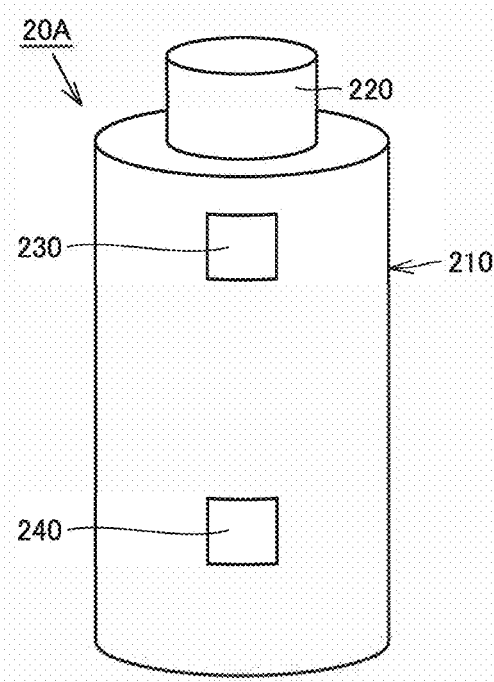
FIG. 6 is a diagram showing a power storage cell according to a second embodiment.
Figure 7:
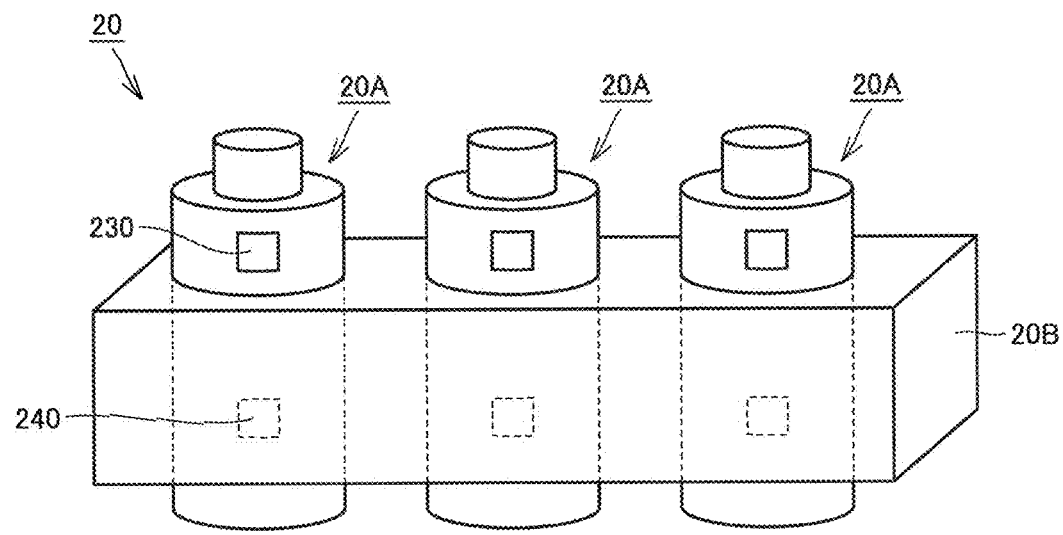
FIG. 7 is a diagram showing a power storage module according to the second embodiment.

FIG. 6 is a diagram showing a power storage cell 20A according to a second embodiment. FIG. 7 is a diagram showing a power storage module 20 formed by arranging a plurality of power storage cells 20A.

As shown in FIG. 6, each of power storage cells 20A includes a main body container 210, an electrode terminal 220, a first indication portion 230, and a second indication portion 240.

Main body container 210 has a substantially cylindrical shape. Electrode terminal 220 is provided at an end portion of main body container 210 in an axial direction thereof.

First indication portion 230 and second indication portion 240 are provided on a side surface of main body container 210. First indication portion 230 and second indication portion 240 are formed on the side surface of main body container 210 so as to be arranged in the axial direction of the substantially cylindrical shape. First indication portion 230 and second indication portion 240 respectively indicate different pieces of identification information.

The identification information (first identification information) indicated on first indication portion 230 includes information required when assembling power storage module 20 or when using power storage module 20, and the identification information (second identification information) indicated on second indication portion 240 includes information required after disassembling power storage module 20.

As shown in FIG. 7, power storage module 20 is constructed by arranging the plurality of power storage cells 20A and coupling them by case 20B. Case 20B accommodates a portion of each main body container 210. First indication portion 230 is exposed to the outside from case 20B. Second indication portion 240 is covered with case 20B and is not exposed to the outside of case 20B.

Thus, as with the first embodiment, also in the present embodiment, in the state in which power storage module 20 including the plurality of power storage cells 20A is formed, first indication portion 230 is exposed to the outside of power storage module 20, and second indication portion 240 is not exposed to the outside of power storage module 20. Therefore, when each of the plurality of different pieces of identification information is required, the piece of identification information can be securely read.

Since the other matters are the same as those in the first embodiment, they will not be described in detail repeatedly.

Third Embodiment

Figure 8:
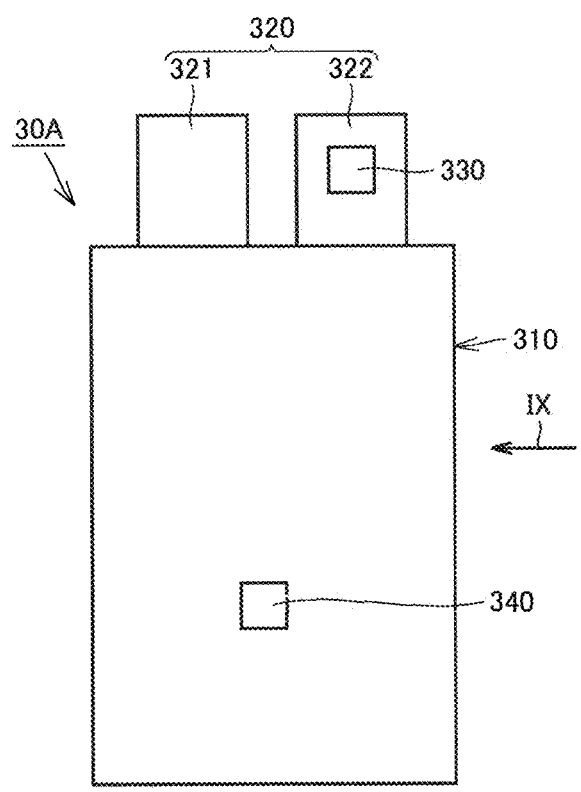
FIG. 8 is a diagram showing a power storage cell according to a third embodiment.
Figure 9:
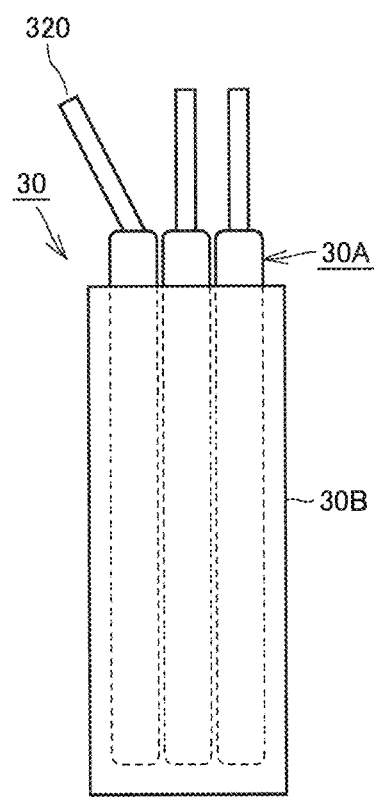
FIG. 9 is a diagram showing a power storage module according to the third embodiment.

FIG. 8 is a diagram showing a power storage cell 30A according to a third embodiment. FIG. 9 is a diagram showing a power storage module 30 formed by stacking a plurality of power storage cells 30A.

As shown in FIG. 8, each of power storage cells 30A includes a main body container 310, an electrode terminal 320, a first indication portion 330, and a second indication portion 340.

Main body container 310 is formed to have a pouch shape. Electrode terminal 320 includes a positive electrode terminal 321 and a negative electrode terminal 322. Electrode terminal 320 is formed to protrude to outside of main body container 310.

First indication portion 330 is provided on electrode terminal 320, and second indication portion 340 is provided on main body container 310. First indication portion 330 and second indication portion 340 respectively indicate different pieces of identification information.

The identification information (first identification information) indicated on first indication portion 330 includes information required when assembling power storage module 30 or when using power storage module 30, and the identification information (second identification information) indicated on second indication portion 340 includes information required after disassembling power storage module 30.

As shown in FIG. 9, power storage module 30 is constructed by stacking the plurality of power storage cells 30A. Main body containers 310 of stacked power storage cells 30A are accommodated in a case 30B. In the example shown in FIG. 9, the upper portion of each main body container 310 is exposed from case 30B, but a whole of main body container 310 may be accommodated in case 30B.

First indication portion 330 provided on electrode terminal 320 is exposed to the outside from case 30B. Second indication portion 340 provided on main body container 310 is visually unrecognizable due to main body container 310 being stacked, and is also covered with case 30B.

Thus, as with the first and second embodiments, also in the present embodiment, in the state in which power storage module 30 including the plurality of power storage cells 30A is formed, first indication portion 330 is exposed to the outside of power storage module 30, and second indication portion 340 is not exposed to the outside of power storage module 30. Therefore, when each of the plurality of different pieces of identification information is required, the piece of identification information can be securely read.

Since the other matters are the same as those in the first and second embodiments, they will not be described in detail repeatedly.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power storage module, comprising:
   a plurality of power storage cells;
   a first indication portion that is provided on each of the power storage cells and that indicates first identification information;
   a second indication portion that is provided on each of the power storage cells and that indicates second identification information different from the first identification information; and
   a case that covers at least part of the plurality of power storage cells,
   wherein
   in a state in which the power storage module including the plurality of power storage cells is formed, the first indication portion is exposed to outside of the power storage module, and the second indication portion is covered with the case and is not exposed to an outside of the power storage module, each of the plurality of power storage cells includes a main body container, each of the first and second indication portions is a label attached to the main body container of each of the plurality of power storage cells and indicating corresponding first or second indication information, or the corresponding first or second indication information directly printed or inscribed on the main body container of each of the plurality of power storage cells, the main body container has a prismatic shape with six surfaces, and an electrode terminal protruding to outside of the main body container, the six surfaces include a first surface on which the electrode terminal is provided and a second surface orthogonal to the first surface, the case includes an abutment portion fixing the plurality of power storage cells to the case by making abutment with the second surface of the main body container, the first indication portion is provided on the first surface of the main body container, and the second indication portion is provided on the second surface of the main body container at a position to avoid the abutment portion.

2. The power storage module according to claim 1, wherein in the state in which the power storage module including the plurality of power storage cells is formed, the second identification information is visually unrecognizable from the outside of the power storage module.

3. The power storage module according to claim 1, wherein the first identification information includes information required when assembling the power storage module.

4. The power storage module according to claim 1, wherein the second identification information includes information required after disassembling the power storage module.

5. The power storage module according to claim 1, wherein each of the plurality of power storage cells is a lithium ion battery.

6. A power storage cell, comprising:

a main body container having a prismatic shape with six surfaces, the six surface including a first surface and a second surface orthogonal to the first surface;

an electrode terminal that protrudes to outside of the main body container and is on the first surface of the main body container;

a first indication portion that indicates first identification information; and a second indication portion that indicates second identification information different from the first identification information, wherein when a power storage module including a plurality of the power storage cells is formed, the first indication portion is exposed to outside of the power storage module from a case that includes an abutment portion fixing the plurality of power storage cells to the case by making abutment with the second surface of the main body container, and the second indication portion is covered by the case and is not exposed to an outside of the power storage module, each of the first and second indication portions is a label attached to the main body container and indicating corresponding first or second indication information, or the corresponding first or second indication information directly printed or inscribed on the main body container, the first indication portion is provided on the first surface of the main body container, and the second indication portion is provided on the second surface of the main body container at a position to avoid the abutment portion.

7. The power storage cell according to claim 6, wherein the first identification information includes information required when assembling the power storage module.

8. The power storage cell according to claim 6, wherein the second identification information includes information required after disassembling the power storage module.

9. The power storage cell according to claim 6, wherein the power storage cell is a lithium ion battery.

10. The power storage cell according to claim 6, wherein the first surface of the main body container is a top surface of the main body container, and the second surface of the main body container is a side surface of the main body container.

11. The power storage cell according to claim 6, wherein the second indication portion is formed at the position higher than the abutment portion.

12. The power storage cell according to claim 6, wherein the abutment portion protrudes from an inner surface of the case to abut the second surface of the main body container without contacting the second indication portion on the second surface of the main body container.

13. The power storage module according to claim 1, wherein the first surface of the main body container is a top surface of the main body container, and the second surface of the main body container is a side surface of the main body container.

14. The power storage module according to claim 1, wherein the second indication portion is formed at the position higher than the abutment portion.

15. The power storage module according to claim 1, wherein the abutment portion protrudes from an inner surface of the case to abut the second surface of the main body container without contacting the second indication portion on the second surface of the main body container.

* * * * *